United States Patent [19]
Herbster

[11] Patent Number: 5,176,931
[45] Date of Patent: Jan. 5, 1993

[54] PREPARATION OF MASA FLOUR

[75] Inventor: Jeffrey C. Herbster, Morrill, Kans.

[73] Assignee: Wenger Manufacturing, Inc., Sabetha, Kans.

[21] Appl. No.: 851,215

[22] Filed: Mar. 13, 1992

[51] Int. Cl.⁵ .............................................. A23L 1/00
[52] U.S. Cl. .................. 426/242; 426/462; 426/464; 426/626
[58] Field of Search ........... 426/242, 462, 464, 483, 426/626

[56] References Cited

U.S. PATENT DOCUMENTS

| | | | |
|---|---|---|---|
| 2,472,971 | 6/1949 | Hansen | 241/8 |
| 3,031,305 | 4/1962 | Weinecke | 426/626 |
| 3,264,113 | 8/1966 | Barta et al. | 426/482 |
| 4,555,409 | 11/1985 | Hart | 426/242 |

OTHER PUBLICATIONS

Cereal Chem. 69(1):82–84; Dry Milling and Physical Characteristics of Alkali-Debranned Yellow Dent Corn.

The Microscopic Examination of Micronized and Extruded Cereals and Cereal Products; Kay Timmins; Spring, 1989; The Proctor Department of Food Science; The University of Leeds.

Primary Examiner—George Yeung
Attorney, Agent, or Firm—Hovey, Williams, Timmons & Collins

[57] ABSTRACT

A short-time, low-pollution method of preparing masa flour is provided which yields flour equivalent to conventionally fabricated masas with a total processing time significantly less than prior techniques. The procedure preferably comprises subjecting alkali-treated, debranned and moisturized grain (e.g., corn) to near infrared radiation in order to partially cook the grain. The grain can then be milled to desired particle size specifications. Masa prepared in accordance with the invention may be produced in as little as one-half hour, as compared with prior methods involving many hours of preparation time. The preferred alkali treatment of the grain prior to infrared processing substantially reduces pollution inherent in prior art methods.

14 Claims, 3 Drawing Sheets

PREPARATION OF MASA FLOUR

BACKGROUND OF THE INVENTION

1. Field of the Invention

The present invention is broadly concerned with a method for the preparation of masa flour which eliminates many of the costly, time-consuming, pollution causing steps conventionally carried out in the preparation of such flours. More particularly, it is concerned with a masa preparation method wherein debranned, moisturized grain (e.g., corn or wheat) is subjected to near infrared radiation for partial cooking thereof, followed by reduction of the cooked, debranned grain to masa flour. The method of the invention may be carried out in as little as one-half hour of processing time, as compared with conventional techniques requiring many hours of preparation time. The resultant flours in accordance with the invention are essentially equivalent to conventional flours in terms of cook, water absorption and handling characteristics.

2. Description of the Prior Art

Masa flour, typically made using food grade corn or wheat, is produced in tremendous quantities in the United States and around the world. Such flour is used to fabricate such familiar products as tortilla chips and taco shells.

Despite the demand for masa flour, for the most part it is prepared using very old and time honored techniques. In the first step, whole kernel corn is cooked in a mixture of water and 1% lime up to a temperature of 175°-205° F., depending upon the hardness of the starting corn and other factors. The corn is then allowed to steep in the lime water for a period of 8-12 hours, in order to allow the lime to penetrate, loosen and partially dissolve the pericarp or bran fraction of the corn.

The steeped corn is then passed through a corn washer, comprising a perforated, rotatable cylinder equipped with internal water jets, in order to complete the removal of bran and to reduce the pH of the corn to about 6.5-7.5.

In the next step, the washed, debranned corn is passed through a stone grinder to mill the corn to a desired particle size and thus complete the flour preparation. The flour may then be appropriately dried for storage, sale and use, or used directly. Masa products are typically prepared by forming a 1:1 (w/w) dough of the masa flour and water, followed by forming the dough through an extruder or other like device, followed with subsequent drying, equilibrating and frying. The final fried masa products are then cooled, salted and packaged.

The conventional masa flour preparation technique presents a number of serious difficulties. First of all, the time required to process the flour is considerable, owing principally to the need for extended steeping. Secondly, the established method has serious ecological consequences, in that the steeping water contains considerable quantities of objectionable dissolved pericarp and soluble starches. Removal of these organic substances from the steeping water is an expensive proposition for masa flour producers, and some flour plants are reported to incur expenses of many thousand dollars per month simply to remove these pollutants from their process streams.

There is accordingly a real and unsatisfied need in the art for an improved masa production method which avoids the long processing times typical of prior methods while reducing concomitant pollution problems.

SUMMARY OF THE INVENTION

The present invention overcomes the problems outlined above and provides a significantly improved method for the production of masa flour from grains such as wheat and corn. Broadly speaking, the method involves first providing a quantity of debranned grain having a moisture content of from about 15-35% by weight, followed by subjecting the debranned, moisturized grain to near infrared radiation to effect partial cooking thereof. The partially cooked grain can then be reduced by conventional milling techniques to masa flour having desired particle sizes.

In preferred forms, the process includes an alkali treatment of starting whole grain followed by abrasion of the alkali-treated grain in order to remove a substantial proportion of the pericarp fraction, without the need for lime water cooking and extended steeping times. The alkali treatment advantageously comprises the steps of forming an aqueous solution of alkali metal hydroxide (e.g., from about 2-20% alkali metal hydroxide), heating the solution to a temperature of from about 100°-160° F., and contacting the whole grain with the heated alkali solution for a period sufficient to loosen the pericarp fraction. Thereafter, the grain may be abraded and washed to substantially remove all pericarp.

The preferred near infrared treatment of the debranned grain comprises subjecting the grain to near infrared radiation having a wavelength of from about 1.8-3.4 microns for a period of from about 10-270 seconds, until the grain has a temperature from about 140°-260° F. and a moisture content of from about 7-20% by weight.

DESCRIPTION OF THE PREFERRED EMBODIMENT

Figure 1:
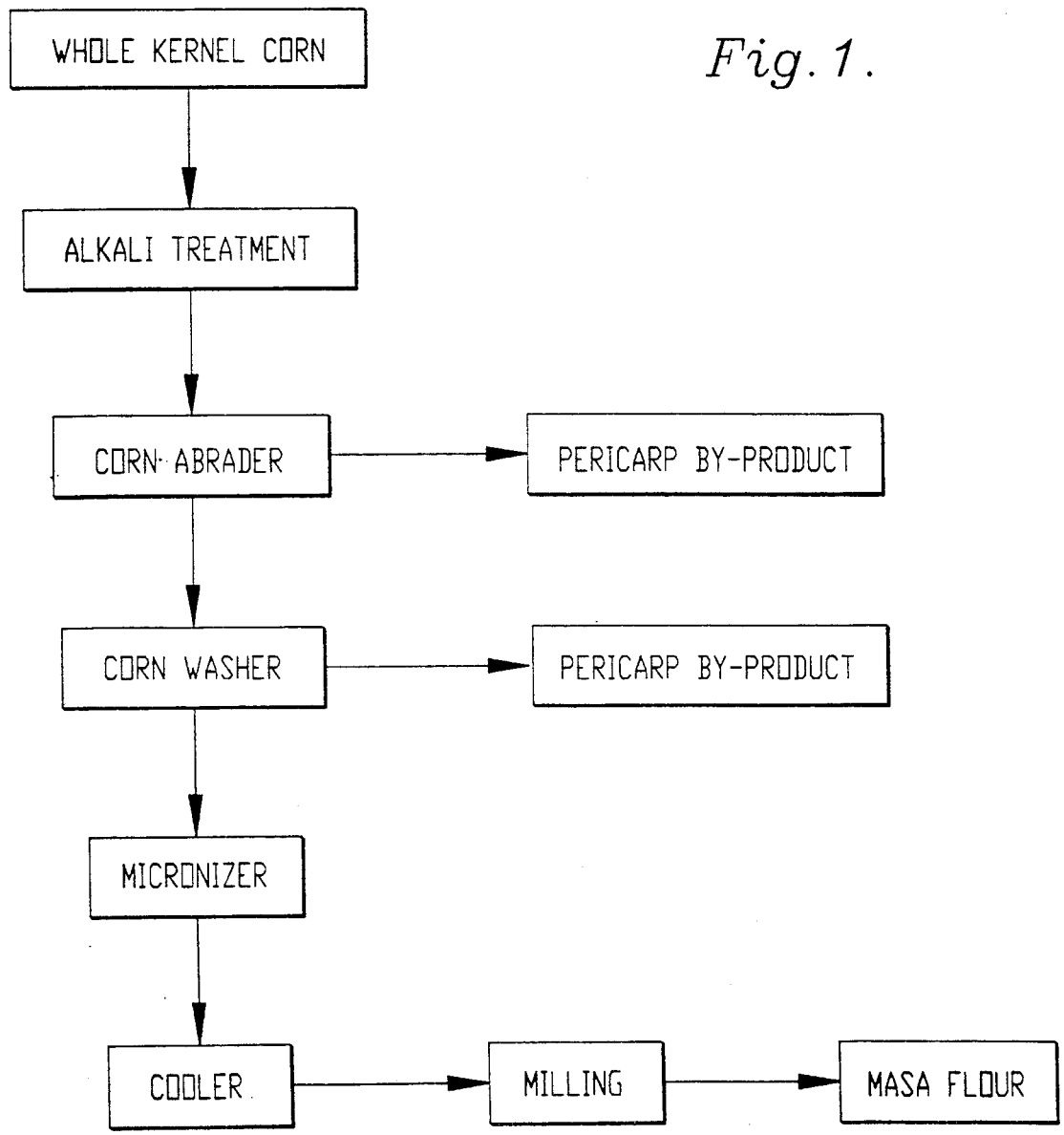
FIG. 1 is a schematic process flow diagram setting forth the preferred masa preparation method of the present invention.

Turning first to FIG. 1, a process flow diagram setting forth the preferred steps in the production of corn masa flour is provided. The method involves first providing an appropriate quantity of whole food grade yellow or white corn which typically has a moisture content of from about 9-15% by weight. This corn is then subjected to an alkali treatment process of the type described by Mistry, et al. in a paper entitled "Dry Milling and Physical Characteristics of Alkali-Debranned Yellow Dent Corn", appearing in *Cereal Chemistry*, 69 (1):82-84 (1992). This paper is incorporated by reference herein. Similar alkali treatments are disclosed in U.S. Pat. Nos. 3,264,113, 3,031,305 and 2,472,971.

In more detail, the preferred alkali treatment comprises first preparing an alkali metal hydroxide solution, such as a 6% NaOH solution. This solution is then heated to a temperature of from about 100°-160° F., more preferably from about 120°-150° F., and most preferably about 135° F. At this point, the corn is added to the heated solution at a level of from about 1:1–4:1 solution:corn on a weight/weight basis. Most preferably, the corn is added at a level of about 2:1 solution:corn. The corn is allowed to remain in the alkali solution for a period of from about 2–12 minutes, more preferably of from about 5–10 minutes, and most preferably about 7 minutes. The corn is then removed from the alkali solution.

The corn may be allowed to set and equilibrate for any convenient time (e.g., 24–72 hours), if desired. However, for the most efficient production, little or no equilibration time is required, and the alkali-treated corn may be directly passed into a rotary grain abrasion device. Such a device is conventional in the milling industry, and serves to mechanically remove pericarp from the whole kernel corn. One useful abrading unit consists of a plastic bristle brush rotating at 160 rpm over a 12-mesh, 150 mm (in diameter) circular screen with a continuous water spray. The peeled pericarp is washed through the 12-mesh screen and collected over a 100-mesh screen below. The process water is recirculated until all of the corn is largely free of pericarp. In practice, the corn should be processed in the abrading device from a period of about 2–10 minutes, typically about 5 minutes.

After abrading, the corn is placed in a continuous corn washer that removes the remainder of any pericarp. The washer includes a rotatable, perforated reel with internal water jets, and has a strainer for catching the removed pericarp.

The debranned corn resulting from this process has a moisture content of from about 15–35% by weight, more preferably from about 20–30% by weight, and most preferably about 25% by weight. The pH of 1:1 (w/w) mixture of water and this debranned corn ranges from about 6.5–7.5.

In the next step as set forth in FIG. 1, the debranned, moisturized corn is subjected to infrared radiation in a micronizer or similar device. The purpose of micronizing is to cause rapid heating of at least the outer portion of the corn while effecting cooking of a fraction of the starch granules therein. In the micronizing process, near infrared or micron sized wavelength radiation is employed, basically in the range of from about 1.8–3.4 microns. This near infrared radiation penetrates the grain, causing constituent molecules to vibrate at a frequency on the order of $8.8 \times 10^7$ MHz, up to $1.7 \times 10^8$ MHz. The resultant inter-molecular friction causes rapid internal heating and a rise in water vapor pressure.

Micronizing is a relatively simple process, wherein the corn is conveyed along a moving belt or vibrating pan over which a near infrared manifold is suspended. The belt is normally vibrated to insure that the corn is constantly turned over, thus exposing all surfaces to the radiation. The rate of flow, and therefore the residence time in the micronizer, is controlled by adjusting the angle of the conveyor. Micronizing is described in U.S. Pat. No. 3,694,220 as well as in a 1989 thesis by Kay Timmins entitled "The Microscopic Examination of Micronized and Extruded Cereals and Cereal Products", both of the latter being incorporated by reference herein.

In the context of the present invention, the near infrared processing should be carried out for a period of from about 10–270 seconds, more preferably from about 50–150 seconds, and most preferably about 90 seconds. The near infrared radiation should have a wavelength of from about 1.8–3.5 microns, and most preferably is in the range from about 2.5 to 3.4 microns. The temperature of the corn exiting the near infrared processor should be from about 140°–260° F., more preferably from about 150°–225° F., and most preferably about 185° F. The moisture of this exiting corn should be from about 7–20% by weight MCWB, more preferably from about 10–15% by weight MCWB, and most preferably about 14% by weight MCWB.

As further illustrated in FIG. 1, following near infrared treatment, the corn should be cooled to ambient using any conventional and expedient technique such as an ambient air cooler. Alternately, the micronized corn may be directed to a holding tank wherein additional cooking will occur by virtue of the elevated temperature of the corn. Such a set period could range up to about 60 minutes, and provide whatever additional cooking may be desired by the processor. After such set time, the corn would then be directed to a cooler as described. At this point, the corn is cooked to the desired extent and fully debranned. The final step involves simply milling the corn to a desired particle size specification, the latter being dictated by the desired end use. Such specifications are well known in the art and vary from customer to customer.

The final corn masa flour is normally used by rehydrating the flour with water, and commonly a 1:1 (w/w) flour:water ratio is used. After such rehydration, the masa flour of the invention will exhibit a moisture level of from about 45–55%, and more preferably from about 48–52%. Microscopic examination of the masa flours produced in accordance with the invention show that they are very similar to conventional flours of this character. Specifically, such examinations demonstrate that the masa flours hereof exhibit substantially intact starch granules with the greatest proportion of these granules non-gelatinized, and respective smaller proportions thereof partially and fully gelatinized. Typical conventional masa flour will have 55% of the starch granules non-gelatinized, 25% partially gelatinized, and 20% fully gelatinized, and the processing steps of the present invention can be selected to essentially duplicate these percentages.

Similar techniques can be employed in the production of masa-type flours from other grains, most notably wheat.

The following examples describe the preferred techniques for producing masa flour in accordance with the invention. It is to be understood, however, that the examples are presented by way of illustration only, and nothing therein should be taken as a limitation upon the overall scope of the invention.

EXAMPLE 1

In this example, cleaned, whole kernel food grade corn (yellow or white) is treated to produce precooked masa flour.

In the first step, fifty pounds of a 6% sodium hydroxide solution is made and heated to a temperature of 135° F. Twenty-five pounds of the food grade corn is next added to the heated solution, and allowed to stand for about 7 minutes in order to break the chemical bonds between the pericarp and endosperm fractions of the corn, thus loosening the pericarp without substantial dissolution thereof.

After this alkali treatment is completed, the corn is removed from the hydroxide solution and placed in a conventional rotary grain abrasion unit of the type described previously. This device serves to further mechanically loosen the pericarp from the whole kernel corn. In practice, the corn is processed in the abrasion unit for about 5 minutes.

The debranned corn is then placed in a continuous grain washer having a perforated, rotatable reel with water jets. The washer serves to detach the loosened pericarp from the kernel corn. The detached pericarp is caught in the strainer of the washing device for subsequent processing or disposal (e.g., neutralize with acid to yield an approximately 92% dietary fiber), and the resultant debranned corn is ready for near infrared treatment. As it emerges from the washer, the debranned corn has a moisture content of approximately 25% by weight MCWB and a pH of from about 6.5-7.5 in a 1:1 (w/w) corn/water mixture. In this example, the debranned corn is allowed to set undisturbed for over 24 hours, inasmuch as the micronizing equipment was physically separated from the alkali treatment and washing apparatus. It is believed, however, that such set time is not required to obtain the desirable results of the invention.

The debranned and moisturized kernel corn is next directed to a micronizer apparatus for near infrared treatment. The micronizer is operated to give a retention time of approximately 90 seconds, resulting in a grain temperature at the exit of the micronizer of 185° F. and a moisture content of 14% by weight MCWB. The wavelength of the near infrared radiation used is in the range of 2.5-3.4 microns. The pan transporting the debranned corn under the infrared burners is vibrated at 60 Hz, and the inclined setting of the main vibrator was 1", in decline.

The effect of micronizing is to gelatinize (i.e., cook) a minor fraction of the starch granules in the corn, to partially gelatinize a greater percentage thereof, and to leave at least about 50% of the granules not gelatinized. The starch granules also retain their identity by virtue of the near infrared treatment. This substantially duplicates the cooked condition of traditional masa flour.

In the next step, the micronized corn is directed to a conventional ambient air cooler where the corn kernels are cooled to ambient. At this point, the corn is milled to desired specifications for a particular masa flour. In this case, the corn was ground to the following sieve profile, typical for use in making tortilla chips:

| U.S. Mesh | % By Weight |
| --- | --- |
| −20 | 7.04 |
| −30 | 8.46 |
| −40 | 18.78 |
| −60 | 26.00 |
| −80 | 38.00 |
| −100 | 1.67 |
| <100 | .05 |

EXAMPLE 2

In the following example, white and yellow corn samples were treated as set forth in Example 1. The alkali treatment, abrading and washing steps were carried out as in Example 1, followed by micronizer treatment and subsequent cooling. The following table summarizes the micronizer conditions.

TABLE

| | RUN = | | |
| --- | --- | --- | --- |
| | 1 | 2 | 3 |
| Grain | Debranned Yellow Corn | Debranned Yellow Corn | Debranned Yellow Corn |
| Near IR Wavelength μ | 3.5-750 | 3.0-800 | 3.0-800 |
| Temperature °C Vibration Frequency of Main Pan | 60 Hz | 60 Hz | 60 Hz |
| Incline of Main Pan | 1" Decline | 1" Decline | 1" Decline |
| Retention Time | 85 sec | 85 sec | 85 sec. |
| Main Gas Air Butterfly Setting | 2.5 | 2.75 | 2.75 |
| Rate Entering Micronizer | 16.2 lb/min | 16.2 lb/min. | 16.2 lb/min. |
| Grain Moisture Entering Micronizer | 18.33% by weight | 18.33% by weight | 17.01% by weight |
| Grain Moisture Exiting Micronizer | 12.36% by weight | 14.02% by weight | 15.78% by weight |
| Grain Temperature Exiting Micronizer | — | 185° F. | 193° F. |

These three grain products were then milled to an appropriate size for masa flour. They were each tested qualitatively by mixing flour and water 1:1 (w/w), and it was found that the flour products of the invention "balled up" in the same fashion as traditional masa flour. Moreover, the moisturized flours of the invention did not stick to the hands when manipulated, which is an important equivalent characteristic of masa flour.

The Run #1 masa flour was also tested using an amylograph, and compared to conventional, commercially available masa flour. Specifically, 45 g of the Run #1 flour was ground through a UDY mill and mixed with 375 ml of water. The mixture was heated for 45 minutes, held for 10 minutes, and cooled for 45 minutes in the amylograph. An identical quantity of commercial flour sold under the name "Masa Mixta" was UDY mill ground, mixed with 375 ml of water and run through the amylograph under the identical conditions set forth above.

Figure 2:
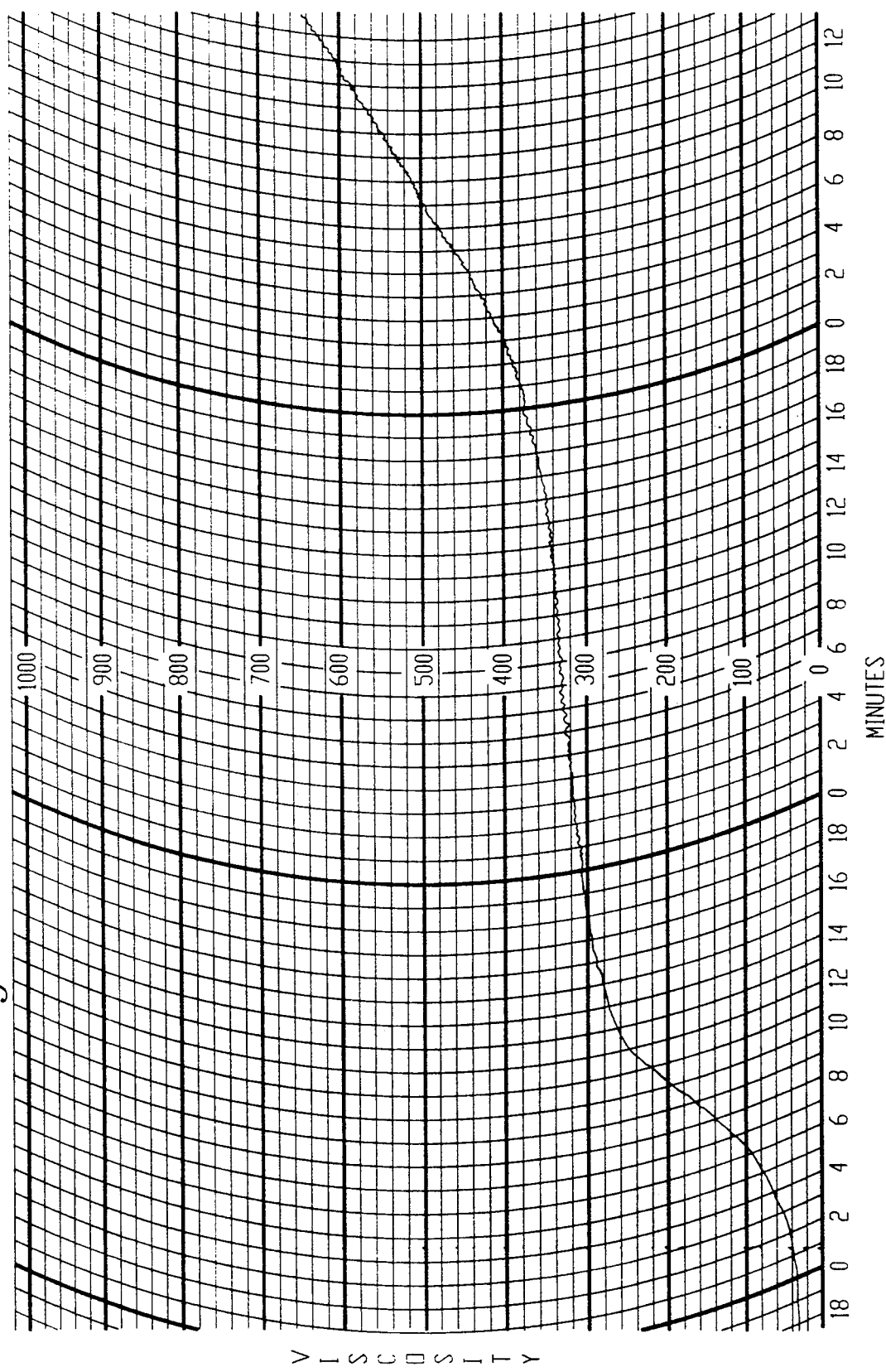
FIG. 2 is a portion of an amylograph obtained using conventional, commercially obtained masa flour.
Figure 3:
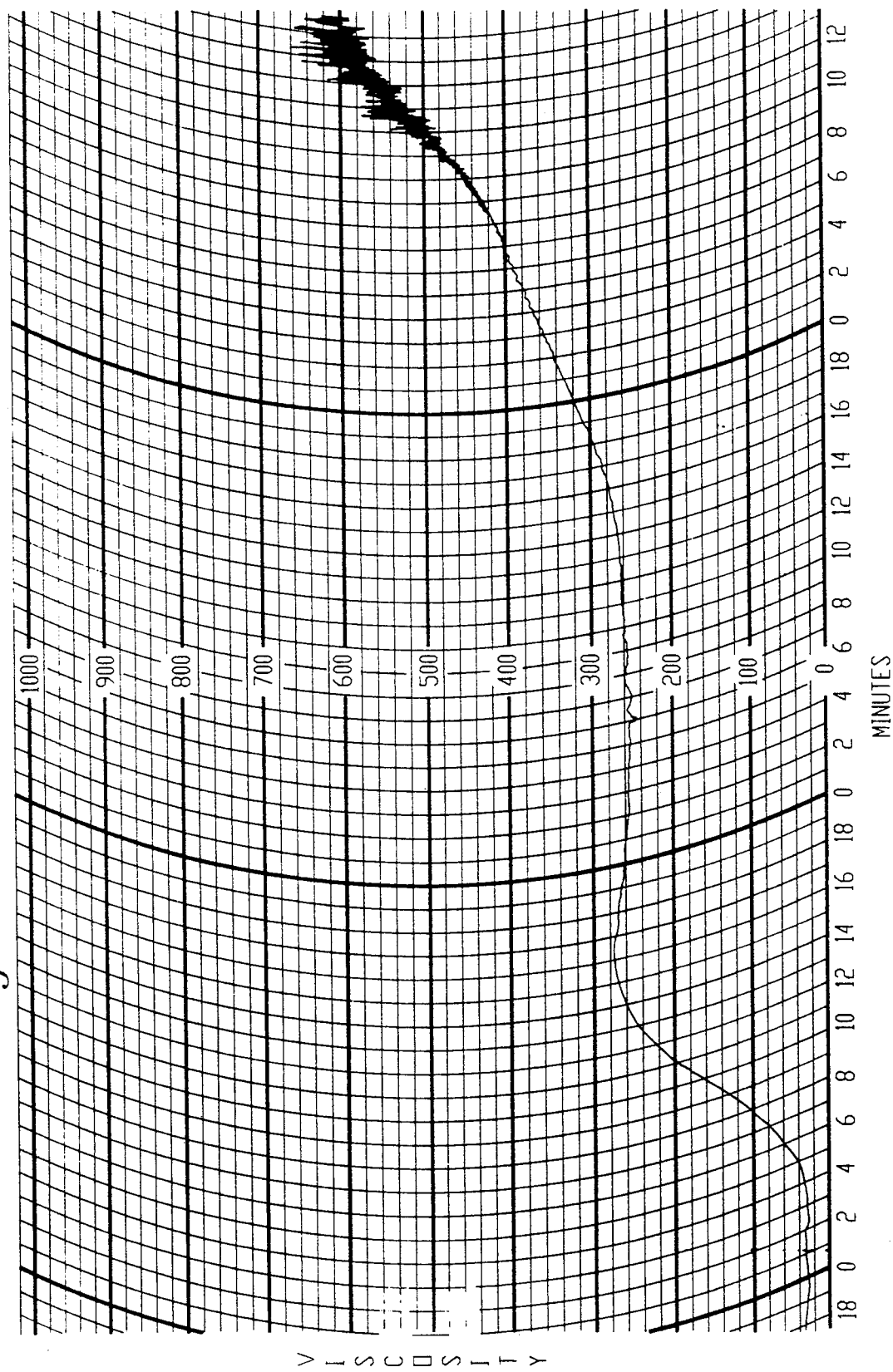
FIG. 3 is a portion of an amylograph obtained using masa flour prepared in accordance with the present invention.

The relevant portion of the amylograph obtained using the Masa Mixta flour is shown in FIG. 2, where the hold time is from 16-6 minutes. FIG. 3 illustrates the same portion of the amylograph obtained using the Run #1 flour, where again the hold time is from 16-6 minutes. It will be observed that these amylographs are very similar to each other, further confirming the fact that the masa flour of the present invention is very similar, if not functionally identical, with conventional masa flour.

The Run #3 flour was also tested for water absorption. The standard for commercial masa flour is that a 1:1 H₂O:flour mixture gives $52\pm2\%$ water moisture. The Run #3 flour gave a water moisture of 52.5%, well within the commercial standard.

A microscopic examination of the flours produced in these three runs demonstrates that they are similar to conventional masa flour, by having intact starch granule structure and a substantial proportion of non-gelatinized starch granules. In order to more closely simulate the conventional flour, the near infrared treatment conditions should be altered to increase the proportion of fully and partially gelatinized starch granules. Such would involve increasing the micronizer residence time and/or increasing the process temperature.

I claim:
1. A method of producing masa flour, comprising the steps of:

providing a quantity of whole grain;

contacting said whole grain with an aqueous alkali metal hydroxide solution for a relatively short period of time sufficient to loosen the bran, removing the bran fraction of said grain, and adjusting the moisture content of the debranned grain as necessary until the debranned grain has a moisture content of from about 15-35% by weight;

subjecting said debranned grain to near infrared radiation for partial cooking thereof; and reducing the partially cooked, debranned grain to masa flour.

2. The method of claim 1, said grain being selected from the group consisting of wheat and corn.

3. The method of claim 2, said grain being corn.

4. The method of claim 1, said partial cooking step comprising subjecting said grain to near infrared radiation for a period of from about 10-270 seconds.

5. The method of claim 1, said partial cooking step being carried out until the grain has a temperature of from about 140°-260° F. and a moisture content of from about 7-20% by weight.

6. The method of claim 1, wherein said bran removal step comprises abrasion of the alkali metal hydroxide-treated grain in order to remove a substantial proportion of the bran from the grain.

7. The method of claim 6, said alkali metal hydroxide contacting comprising the steps of forming an aqueous solution of sodium hydroxide and heating the solution to a temperature of from about 100°-160° F., contacting said whole grain with said heated solution for a period sufficient to loosen said bran.

8. The method of claim 1, a 1:1 (w/w) dispersion of said debranned grain in water having a pH from about 6.5-7.5.

9. The method of claim 1, including the step of cooling said cooked grain prior to said reduction step.

10. The method of claim 1, said contacting step being carried out for a period of from about 2-12 minutes.

11. The method of claim 10, said period being from about 5-10 minutes.

12. The method of claim 9, including the step of directing said grain to a holding tank for additional cooking thereof prior to said cooling step.

13. The method of claim 9, wherein said cooling is carried out until the grain is cooled to about ambient temperature.

14. The method of claim 1, said aqueous alkali metal solution being heated.

* * * * *